United States Patent
Ferris et al.

(10) Patent No.: US 8,341,625 B2
(45) Date of Patent: Dec. 25, 2012

(54) SYSTEMS AND METHODS FOR IDENTIFICATION AND MANAGEMENT OF CLOUD-BASED VIRTUAL MACHINES

(75) Inventors: James Michael Ferris, Cary, NC (US); David P. Huff, Raleigh, NC (US); Bryan Kearney, Raleigh, NC (US); Tomislav Vujec, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 997 days.

(21) Appl. No.: 12/128,768

(22) Filed: May 29, 2008

(65) Prior Publication Data

US 2009/0300607 A1    Dec. 3, 2009

(51) Int. Cl.
G06F 9/455    (2006.01)

(52) U.S. Cl. .......................................... 718/1

(58) Field of Classification Search .................. None
See application file for complete search history.

(56) References Cited

U.S. PATENT DOCUMENTS

| | | |
|---|---|---|
| 6,272,677 B1 | 8/2001 | Lam et al. |
| 6,463,457 B1 | 10/2002 | Armentrout et al. |
| 6,801,937 B1 * | 10/2004 | Novaes et al. ............. 709/220 |
| 7,171,476 B2 * | 1/2007 | Maeda et al. .............. 709/227 |
| 7,313,796 B2 | 12/2007 | Hamilton et al. |
| 7,439,937 B2 | 10/2008 | Ben-Shachar et al. |
| 7,529,785 B1 | 5/2009 | Spertus et al. |
| 7,546,462 B2 | 6/2009 | Upton |
| 7,596,620 B1 | 9/2009 | Colton et al. |
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0049573 A1 * | 3/2004 | Olmstead et al. ............. 709/224 |
| 2004/0162902 A1 | 8/2004 | Davis |
| 2004/0210591 A1 | 10/2004 | Hirschfeld et al. |
| 2004/0210627 A1 | 10/2004 | Kroening |

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Emerson Puente
*Assistant Examiner* — Dong Kim
(74) *Attorney, Agent, or Firm* — Lowenstein Sandler PC (57) ABSTRACT

Embodiments relate to systems and methods for identification and management of cloud-based virtual machines. A user requests the instantiation of a set of virtual machines from a cloud computing environment. A cloud management system requests the resources necessary to build the machines from a set of resource servers. After populating the set of virtual machines from the cloud, the cloud management system inserts a token ID into one of the virtual machines to designate that machine as a management instance. An image of that machine can be stored in the cloud management system to represent the configuration of the set of virtual machines, even when the cloud itself lacks permanent storage. When the user wishes to update the set of virtual machines, the cloud management system can insert another token ID into another virtual machine, reconfigure the software, processing, or other resources of that machine as a revised management instance.

26 Claims, 5 Drawing Sheets

U.S. PATENT DOCUMENTS

| | | | |
|---|---|---|---|
| 2004/0268347 A1 | 12/2004 | Knauerhase et al. | |
| 2005/0060704 A1* | 3/2005 | Bulson et al. | 718/1 |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0088524 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0034364 A1* | 2/2008 | Lam et al. | 718/1 |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0091613 A1 | 4/2008 | Gates et al. | |
| 2008/0104608 A1 | 5/2008 | Hyser et al. | |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris et al. | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0299366 A1 | 11/2010 | Stienhans et al. | |
| 2011/0016214 A1 | 1/2011 | Jackson | |
| 2011/0131335 A1 | 6/2011 | Spaltro et al. | |

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. .Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

DeHaan, "Methods and Systems for Abstracting Cloud Management", U.S. Appl. No. 12/474,113, filed May 28, 2009.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 23, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31. 2011.

Red Hat Final Office Action for U.S. Appl. No. 12/128,233 mailed Oct. 29, 2011.

Red Hat Office Action for U.S. Appl. No. 12/128,233 mailed May 11, 2011.

Red Hat Office Action for U.S. Appl. No. 12/128,233 mailed Aug. 11, 2011.

Red Hat Office Action for U.S. Appl. No. 12/128,233 mailed Mar. 2, 2011.

* cited by examiner

SYSTEMS AND METHODS FOR IDENTIFICATION AND MANAGEMENT OF CLOUD-BASED VIRTUAL MACHINES

FIELD

The present teachings relate to systems and methods for the identification and management of cloud-based virtual machines, and more particularly to platforms and techniques for instantiating and configuring a set of virtual machines by generating a management instance of the virtual machines.

BACKGROUND OF RELATED ART

The advent of cloud-based computing architectures has opened new possibilities for the rapid and scalable deployment of virtual Web stores, media outlets, and other online sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

When a set of virtual machines are instantiated, however, issues in the management of the configuration and identities of those transient machines can arise. For one, some cloud environments may offer compute and storage services separately and in such cases, create "stateless" compute nodes. After the set of virtual machines are built and instantiated, it may therefore be difficult or impossible to store an image of one of the virtual machines to create a template of the instantiated objects for future reference. If the user decides to update the configuration of the set of existing virtual machines, as a consequence there may be no way to access a template of the existing machines, and audit the hardware, software, and communications resources assigned to those machines. As a result, it may be difficult or impossible to perform an automatic update of all component resources to generate an updated set of virtual machines. The user therefore may have to configure updated virtual machines manually.

The configuration of any resulting updated set of virtual machines may likewise not be able to be automatically captured for management and identification purposes. It may be desirable to provide methods and systems for the management of cloud-based virtual machines that permits a user or network operator to track, store and manage the configurations of virtual machines, including in environments which lack permanent storage.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for the identification and management of cloud-based virtual machines. More particularly, embodiments relate to platforms and techniques in which a cloud management system can create a special management instance of a set of virtual machines, and then turn that management instance on and off to store images of the configuration of those machines, and perform network maintenance on that larger set of machines.

According to embodiments, in general a user can request the instantiation of a set of virtual machines from a cloud computing environment, which can include a set of resource servers configured to deliver processor cycles, operating systems or components thereof, applications, input/output bandwidth, or other computing resources. The cloud management system identifies the resources necessary to build and launch a set of virtual machines to the user's specification, and requests those resources from the set of resource servers. After populating the set of virtual machines from the cloud, the cloud management system inserts a token ID into one of the virtual machines to designate that machine as a management instance. An image of that machine can be stored in the cloud management system to represent the configuration of the set of virtual machines, which in some cloud environments can not be stored to permanent storage.

Individual virtual machines built from that stored configuration can be identified by an IP address, serial number, or other identification. When the user, systems operator, or other administrator or entity wishes to update or reconfigure the set of virtual machines, the cloud management system can select another virtual machine to insert another token ID, reconfigure the operating system, software, processing, or other resources of that virtual machine as a second or further management instance, and repopulate a revised set of virtual machines to the updated specification. The original set of virtual machines can be permitted to operate, or can be retired or terminated from the cloud. The revised management instance can be stored to or via the cloud management system, and the process of updating the configuration of the set of virtual machines can be repeated as many times as desired. The cloud management system can therefore build, launch and store copies of configuration images of the set of virtual machines, even in cloud environments where permanent storage is not available. These and other embodiments described herein address the various noted shortcomings in known cloud computing technology, and provide a user or network operator with an enhanced set of management tools to identify, track and update sets of instantiated virtual machines.

Reference will now be made in detail to exemplary embodiments of the present teachings, which are illustrated in the accompanying drawings. Where possible the same reference numbers will be used throughout the drawings to refer to the same or like parts.

Figure 1:
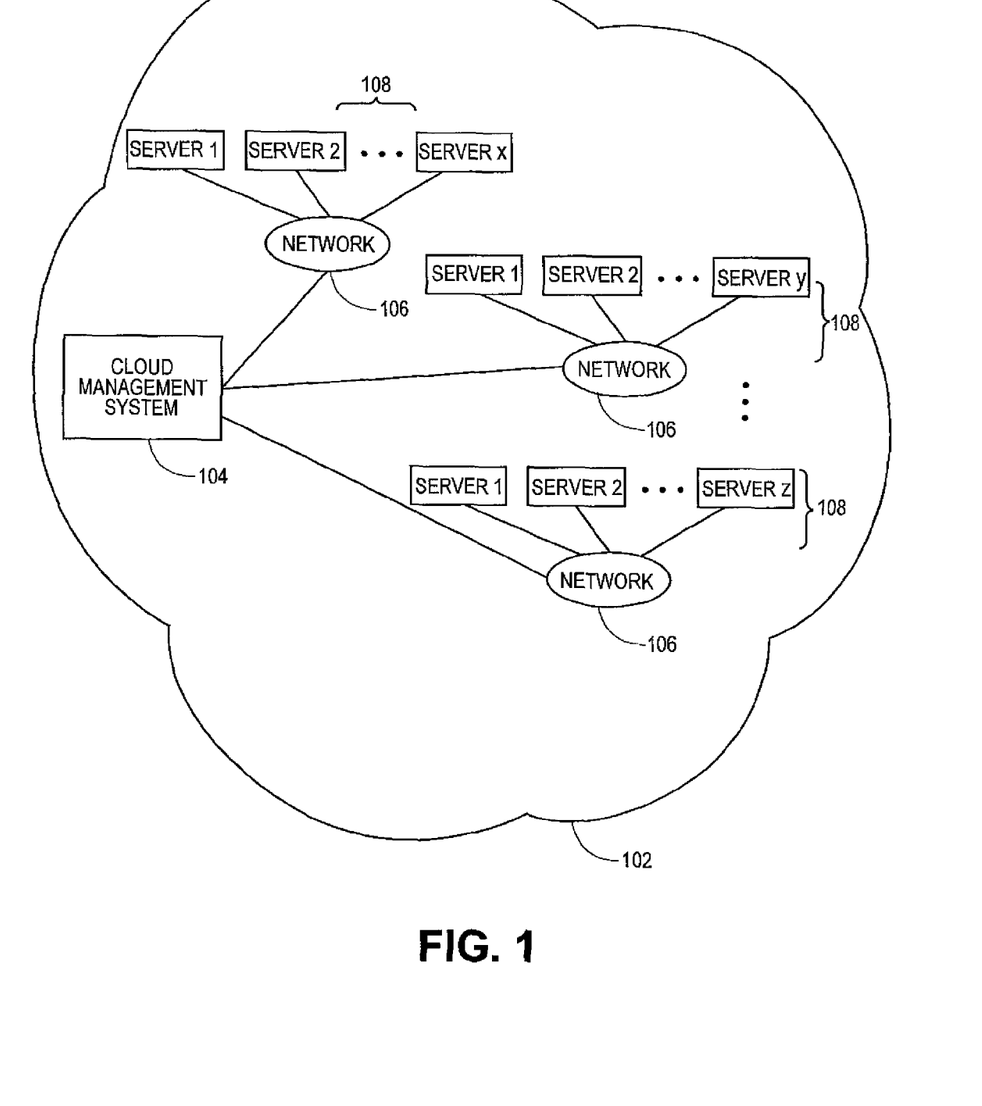
FIG. 1 illustrates an overall cloud system architecture in which various embodiments of the present teachings can be practiced.

FIG. 1 illustrates an overall cloud computing environment, in systems and methods for the identification and management of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
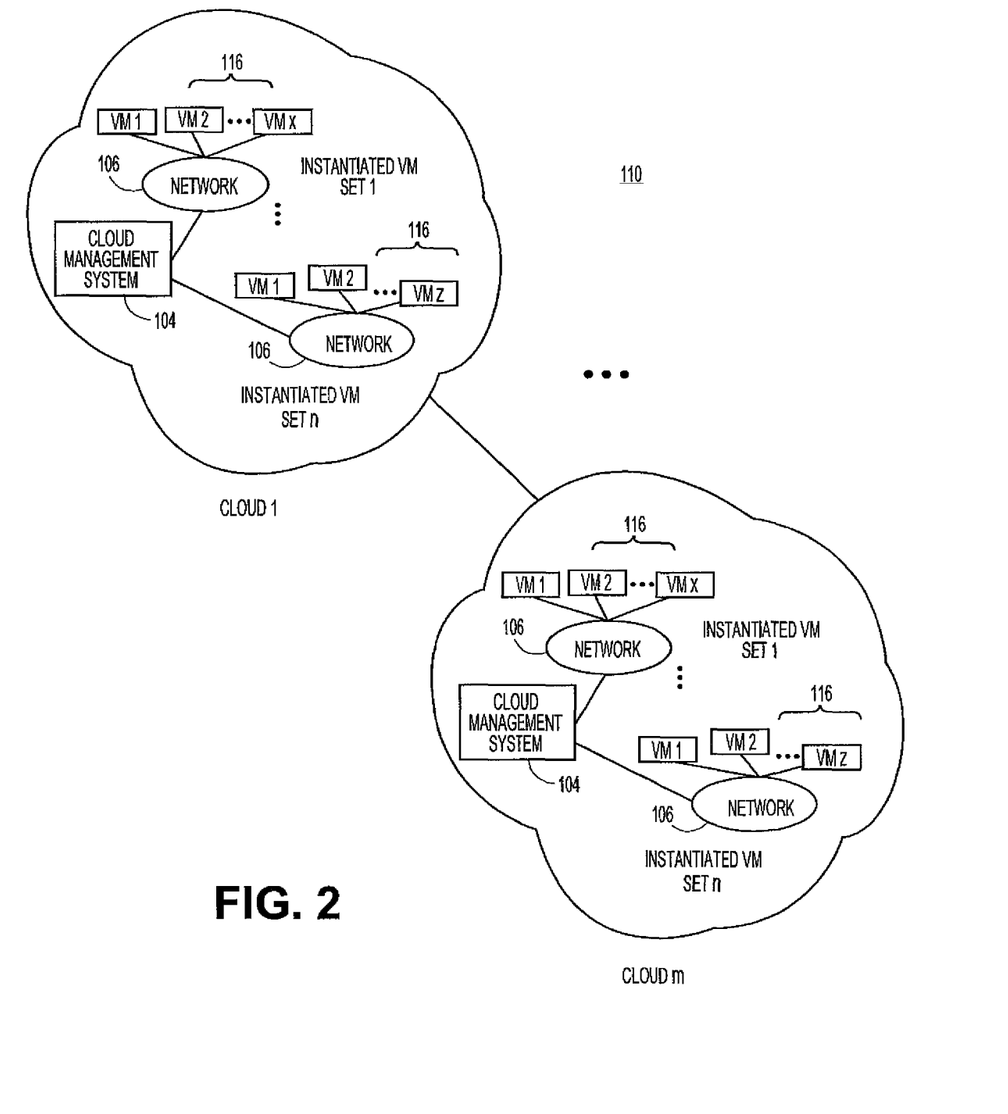
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
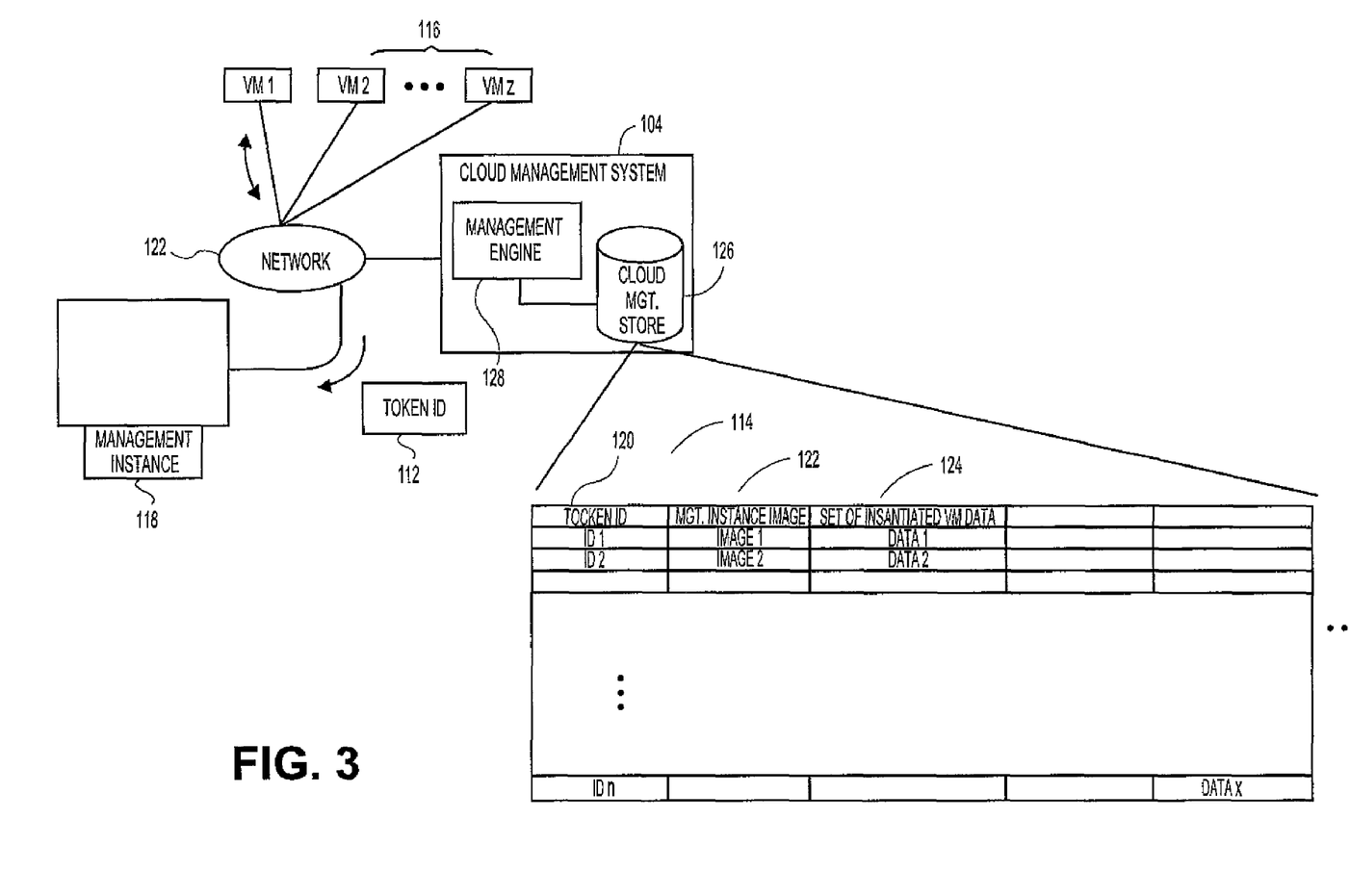
FIG. 3 illustrates a network configuration in which a cloud management system can use a token ID to generate a management instance of a virtual machine, according to various embodiments.

FIG. 3 illustrates aspects of a cloud management system 104 and its management of the set of instantiated virtual machines 116 of a cloud 102, according to various embodiments. In embodiments as shown, the cloud management system 104 can comprise a management engine 128 containing control logic and a cloud management store 126. In embodiments as shown, the cloud management system 104 communicates with a set of instantiated virtual machines 116 via one or more networks 106, such as the Internet or other public or private network. The set of instantiated virtual machines 116 can be or include, for instance, a set of virtual servers that can support online services or sites, such as Web storefronts or music download or other media delivery. In embodiments as shown, the building of the set of instantiated virtual machines 116 can be initiated based on an instantiation request from a user, including the specification for software, computing, or other resources.

As part of the process of building set of instantiated virtual machines 116, the cloud management system 104 instantiates a first virtual machine and transmits a token ID 112 to insert or embed into that machine. The token ID 112 can be, for instance, a file, certificate, cookie, or other identification object encoding a unique identifier for that virtual machine. The incorporation of token ID 112 into a first or selected virtual machine can transform that machine into a management instance 118. The status of being a management instance 118 including the presence of the token ID 112 can permit cloud management system 104 to directly configure, manage, store and track the management instance 118. Cloud management system 104 can, for example, set the operating system, application, processing level, bandwidth, and other parameters specifying the resources and capability of management instance 118, and store an management instance image 122 of management instance including that information to cloud management store 126. According to embodiments, while configured as management instance 118, the virtual machine can be made not visible to other machines or resources in cloud 102, other than cloud management system 104.

After configuration and capture of an image of management instance 118, cloud management system 104 can remove or delete token ID 112 from the management instance 118 causing that virtual machine to revert to non-management status. With that machine no longer containing an embedded unique token ID 112, cloud management system 104 can duplicate or copy the machine in the selected configuration to generate the complete set of instantiated virtual machines 116. According to embodiments, the set of instantiated virtual machines 116 can be a set of identical virtual machines such as servers, clients or other machines or resources, and each be visible to each other and the remainder of cloud 102.

In embodiments as shown, cloud management system 104 can register the set of instantiated virtual machines 116 built off the management instance 118 by recording the token ID field 120, management instance image 122, and set of instantiated virtual machine data 124 in configuration table 114. The set of instantiated virtual machine data 124 can include an identification of the number of virtual machines, duration of use or expiration times for one or more virtual machine in the set, an IP address or other identifier for each virtual machine, or other information.

According to embodiments in one regard, when the user, operator of cloud management system 104, or other party wishes to update or alter the configuration of the set of instantiated virtual machines 116, the cloud management system 104 can select an individual virtual machine in set of instantiated virtual machines 116 to insert a further token ID 112 into that machine. Insertion of token ID 112 into a selected virtual machine creates a new management instance 118, whose configuration the cloud management system 104 can then update. The cloud management system 104 can then follow the same process of removing the token ID 112, and duplicating the image to produce a revised set of instantiated virtual machines 116. A new or revised management instance image 122 along with revised set of instantiated virtual machine data 124 can then be captured and stored to cloud management store 126, along with token ID 112 in token ID field 120. In embodiments, the cloud management system 104 can terminate or retire prior versions of the set of instantiated set of virtual machines 116 once an update cycle is complete. Further update cycles to alter or update the set of instantiated virtual machines 116 can be performed.

Figure 4:
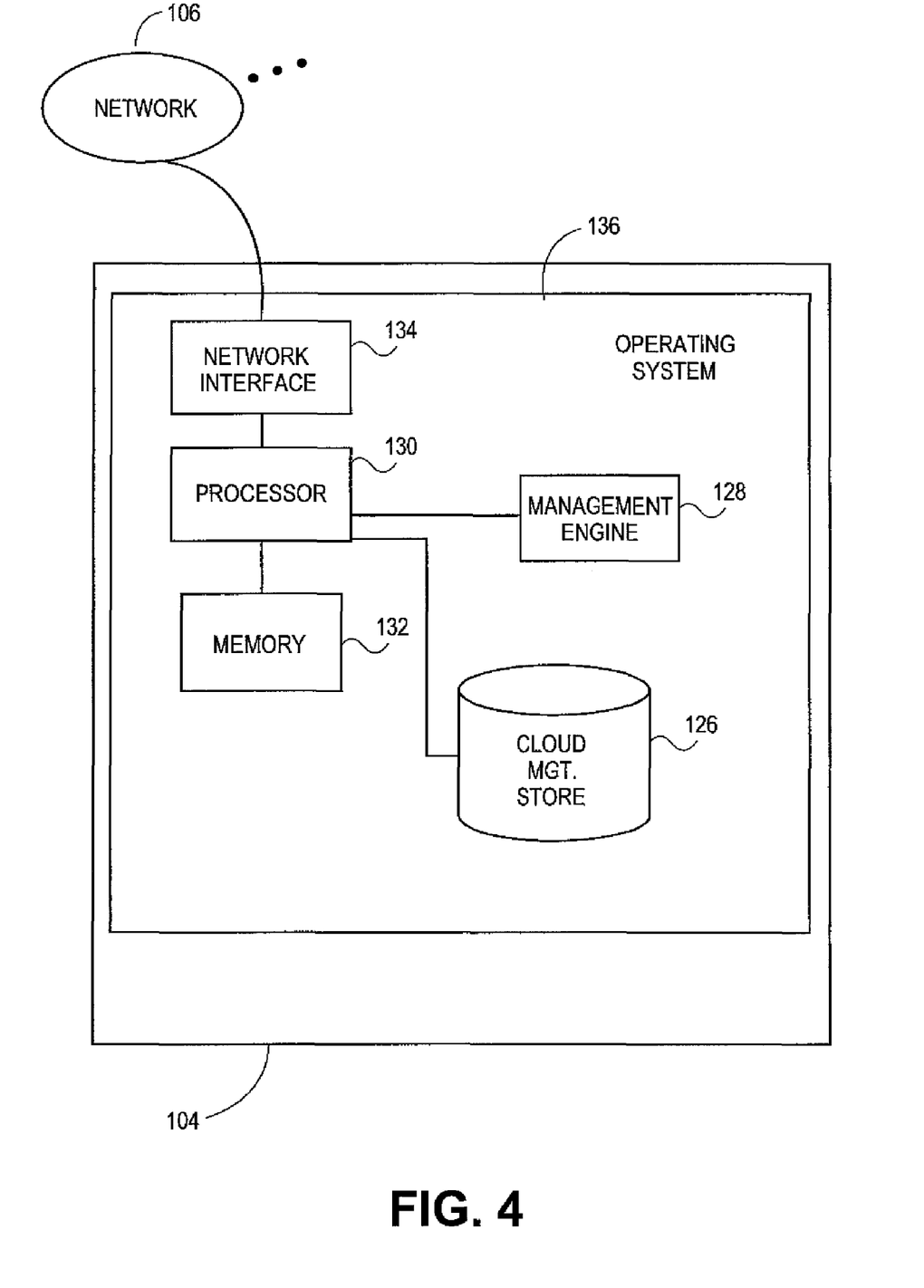
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with set of instantiated virtual machines 116 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud management store 126, such as a database stored on a local hard drive. Processor 130 further communicates with network interface 134, such as an Ethernet or wireless data connection, which in turn communicates with one or more networks 106, such as the Internet or other public or private networks. Processor 138 also communicates with could management store 126 and management engine 128, to execute control logic and control the operation of virtual machines and other resources in cloud 102. Other configurations of cloud management system 104, associated network connections, and other hardware and software resources are possible.

Figure 5:
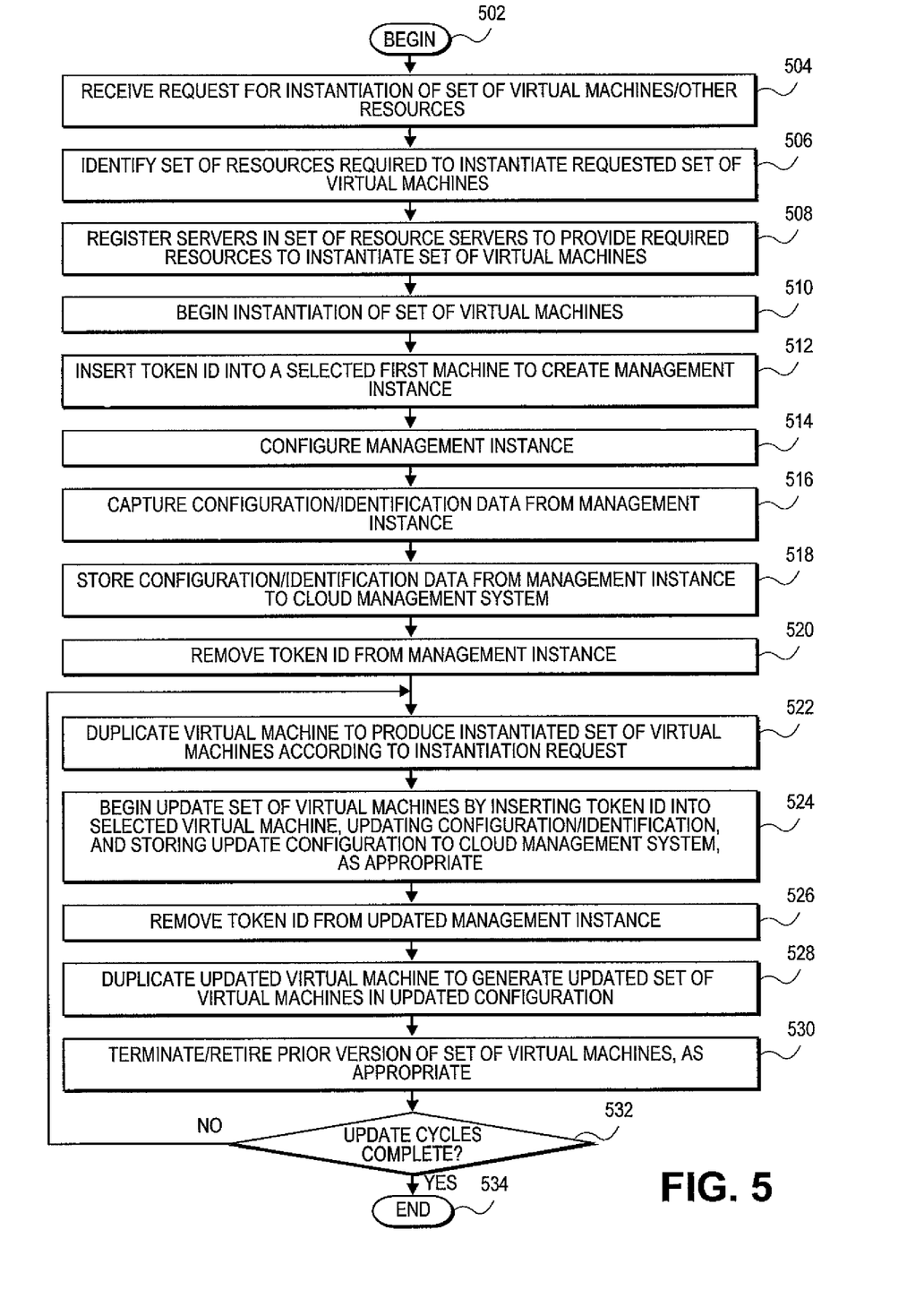
FIG. 5 illustrates a flowchart for overall virtual machine identification and management in a cloud computing environment, according to various embodiments.

FIG. 5 illustrates a flow diagram of overall virtual machine management in a cloud environment, according to embodiments of the present teachings. In step 502, processing can begin. In step 504, cloud management system 104 can receive an instantiation request from a customer, administrator, or other user to instantiate a set of virtual machines or other resources. In step 506, cloud management system 104 can identify a set of resources required to instantiate and/or support the requested set of virtual machines. In step 508, the cloud management system 104 can identify and register a group of servers in a set of resource servers 108 to provide the required resources to instantiate the requested set of virtual machines. In step 510, the cloud management system 104 can begin the instantiation of the set of virtual machines based on the user's request, for example by instantiating a first virtual machine conforming to those specifications.

In step 512, the cloud management system 104 can insert a token ID 112 into the first virtual machine to create a management instance 118. The token ID 112 can be a unique identifier specifically identifying management instance 118, permitting cloud management system 104 to identify, track and manage management instance 118. In step 514, the user can configure the management instance 118 via cloud management system 104, for example, to specify software and computing resources to be installed in or made available to the management instance 118. In step 516, cloud management system 104 can capture an image of management instance 118. The image can include identification data such as token ID 112. The image can further include selected and installed software resources such as an installed operating system, applications, software appliances, or other software resources. The image can include computing resources such as allocated processor power, memory, input/output (I/O) throughput or other computing resources. In step 518, the image of management instance 118 can be stored to cloud management system 104, for example in hard drive or other permanent storage of cloud management system 104.

In step 520, the cloud management system 104 can remove token ID 112 from management instance 118, causing that virtual machine to revert to a non-management instance. In step 522, the cloud management system 104 can duplicate the reverted non-management instance to produce a complete set of instantiated virtual machines 116, according to the user's instantiation request. The number of virtual machines in set of instantiated virtual machines 116 can be configured by the user, or in embodiments by the operator of the cloud management system 104.

In step 524, the cloud management system 104 can begin an update to the initial or preceding version of the set of instantiated virtual machines 116 by inserting a token ID 112 into a selected one of the set of instantiated virtual machines 116 to create a new or revised management instance 118, and updating the configuration/identification of the management instance 118. The cloud management system 104 can also store an image of the revised management instance 118 to record the updated configuration.

In step 526, after storing the updated image of the management instance 118, the cloud management system 104 can remove the token ID 112 from the management instance 118 to cause the associated virtual machine to revert to a non-management instance. In step 528, the updated non-management virtual machine can be duplicated to generate a revised or updated set of instantiated virtual machines 116 in the updated configuration in step 530, the cloud management system 104 can terminate or retire the prior version of the set of instantiated virtual machines 116, as appropriate. In step 532, a determination can be made whether all desired updated cycles have been completed. If not, processing can return to step 524. If the determination in step 532 is that all update cycles have been completed, processing can be proceed to step 534 where, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system and 104 associated logic can be distributed among multiple servers or systems. Similarly, while embodiments have been described in which one group of servers within a set of resource servers 108 can provide one component to build a requested set of virtual machines, in embodiments, one group of resource servers can deliver multiple components to populate the requested set of virtual machines 116. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
   instantiating, by a management server device of a cloud computing system, a set of virtual machines in computing devices of the cloud computing system;
   inserting, by the management server device, a single token ID which is not an identifier used to identify a virtual machine of the set of virtual machines, the single token ID to designate the virtual machine as a management instance virtual machine of the set of virtual machines, wherein the presence of the single token ID in the management instance virtual machine allows the management server device to directly configure, manage, store, and track the management instance virtual machine;
   registering, by the management server device, the management instance virtual machine to a database of the management server device;
   storing, by the management server device, an image of the management instance virtual machine to the database in order to record a configuration record of the set of virtual machines; and
   changing, by the management server device, a configuration of the management instance virtual machine, wherein changing the configuration comprises at least one of setting an operating system, changing one or more applications, adding one or more applications, deleting one or more applications, updating processing level, or updating bandwidth.

2. The method of claim 1, wherein the cloud computing system comprises a set of resource servers configured to deliver resources to instantiate the set of virtual machines.

3. The method of claim 1, wherein individual virtual machines in the set of virtual machines are identified by an identification field in the configuration record.

4. The method of claim 1, further comprising storing an image of the changed configuration of the management instance virtual machine to the database of the management server device.

5. The method of claim 4, further comprising removing the single token ID of the management instance virtual machine having the changed configuration.

6. The method of claim 5, further comprising generating a revised set of virtual machines based on the changed configuration.

7. The method of claim 6, further comprising retiring the set of virtual machines upon generation of the revised set of virtual machines.

8. The method of claim 6, further comprising inserting a single token ID in a virtual machine of the revised set of virtual machines to generate a revised management instance virtual machine of the revised set of virtual machines.

9. The method of claim 8, further comprising storing an image of the revised management instance virtual machine to the database of the management server device in order to record a configuration record of the revised set of virtual machines.

10. A system for managing the identification of entities in a cloud computing environment, comprising:
 a memory;
 a processor communicably coupled to the memory;
 a network interface device to communicably couple the memory and the processor to a set of virtual machines in a cloud computing environment; and
 a cloud management module executed from the memory by the processor and communicating with the cloud computing environment via the network interface device, the cloud management module configured to:
 inserting a single token ID which is not an identifier used to identify a virtual machine of the set of virtual machines, the single token ID to designate the virtual machine as a management instance virtual machine of the set of virtual machines, wherein the presence of the single token ID in the management instance virtual machine allows the management server device to directly configure, manage, store, and track the management instance virtual machine;
 register the management instance virtual machine in a database of the cloud management module;
 store an image of the management instance virtual machine to the database in order to record a configuration record of the set of virtual machines; and
 change a configuration of the management instance virtual machine, wherein changing the configuration comprises at least one of setting an operating system, changing one or more applications, adding one or more applications, deleting one or more applications, updating processing level, or updating bandwidth.

11. The system of claim 10, wherein the cloud computing environment comprises a set of resource servers configured to deliver resources to instantiate the set of virtual machines.

12. The system of claim 10, wherein individual machines in the set of virtual machines are identified by an identification field in the configuration record.

13. The system of claim 10, wherein the cloud management module is further configured to store an image of the changed configuration of the management instance virtual machine to the database of the cloud management module.

14. The system of claim 13, wherein the cloud management module is further configured to remove the single token ID of the management instance virtual machine having the changed configuration.

15. The system of claim 14, wherein the cloud management module is further configured to generate a revised set of virtual machines based on the changed configuration.

16. The system of claim 15, wherein the cloud management module is further configured to retire the set of virtual machines upon generation of the revised set of virtual machines.

17. The system of claim 15, wherein the cloud management module is further configured to insert a single token ID in a virtual machine of the revised set of virtual machines to generate a revised management instance virtual machine of the revised set of virtual machines.

18. The system of claim 17, wherein the cloud management module is further configured to store an image of the revised management instance virtual machine to the database of the cloud management module in order to record a configuration record of the revised set of virtual machines.

19. A computer-implemented method comprising:
 receiving, by a virtual machine of a set of virtual machines executed in a resource server device of a cloud computing system, a single token ID from a management server device of the cloud computing system which is not an identifier used to identify a virtual machine of the set of virtual machines, the single token ID to designate the virtual machine as a management instance virtual machine, wherein the presence of the single token ID in the management instance virtual machine allows the management server device to directly configure, manage, store, and track the management instance virtual machine;
 changing, by the management instance virtual machine of the resource server device, a configuration of the management instance virtual machine based on instructions from the management server device, wherein changing the configuration comprises at least one of setting an operating system, changing one or more applications, adding one or more applications, deleting one or more applications, updating processing level, or updating bandwidth; and
 providing, by the virtual machine of the resource server device, identification and configuration data to the management server device for registration of the management instance virtual machine to a database of the management server device and storage of an image of the management instance virtual machine to the database in order to record a configuration record of the set of virtual machines.

20. The method of claim 19, wherein the cloud computing system comprises a set of resource server devices configured to deliver resources to instantiate the set of virtual machines.

21. The method of claim 19, wherein individual virtual machines in the set of virtual machines are identified by an identification field in the configuration record.

22. The method of claim 19, wherein the single token ID of the management instance virtual machine is removed subsequent to changing the configuration.

23. The method of claim 22, wherein the management server device generates a revised set of virtual machines based on the changed configuration of the management instance virtual machine.

24. The method of claim 23, wherein the management server device retires the set of virtual machines upon generation of the revised set of virtual machines.

25. The method of claim 23, wherein the management server device inserts a single token ID in a virtual machine of the revised set of virtual machines to generate a revised management instance virtual machine of the revised set of virtual machines.

26. The method of claim 25, wherein the management server device stores an image of the revised management instance virtual machine to the database in order to record a configuration record of the revised set of virtual machines.

* * * * *